United States Patent
Suzuki et al.

(10) Patent No.: US 6,500,236 B2
(45) Date of Patent: Dec. 31, 2002

(54) METHOD FOR DECARBONATING WASTE GAS AND DECARBONATING APPARATUS

(75) Inventors: Minoru Suzuki, Kamakura; Mitio Ishibasi, Hachiouji; Kuninobu Ootake; Jun Imada, both of Kawasaki; Hiroyuki Takagi, Tokyo; Hidetoshi Ueno, Kokubunji, all of (JP)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 36 days.

(21) Appl. No.: 09/764,116

(22) Filed: Jan. 19, 2001

(65) Prior Publication Data

US 2001/0009124 A1 Jul. 26, 2001

(30) Foreign Application Priority Data

Jan. 25, 2000 (JP) ........................................ 2000-015892

(51) Int. Cl.⁷ .............................................. B01D 53/06
(52) U.S. Cl. .............................. 95/113; 95/139; 96/125
(58) Field of Search ............................. 96/125; 95/113, 95/139

(56) References Cited

U.S. PATENT DOCUMENTS

| | | | | |
|---|---|---|---|---|
| 3,009,540 A | * | 11/1961 | Munters | |
| 3,009,684 A | * | 11/1961 | Munters | |
| 3,470,708 A | * | 10/1969 | Weil et al. | |
| 4,012,206 A | | 3/1977 | Macriss et al. | |
| 4,398,927 A | * | 8/1983 | Asher et al. | |
| 4,409,006 A | * | 10/1983 | Mattia | |
| 4,701,189 A | * | 10/1987 | Oliker | |
| 4,948,392 A | * | 8/1990 | Rush | |
| 5,149,374 A | * | 9/1992 | Coellner | |
| 5,158,582 A | * | 10/1992 | Onitsuka et al. | |
| 5,167,679 A | * | 12/1992 | Maekawa et al. | |
| 5,170,633 A | * | 12/1992 | Kaplan | |
| 5,659,974 A | | 8/1997 | Graeff | |
| 5,695,546 A | * | 12/1997 | Izumi et al. | |
| 5,702,505 A | * | 12/1997 | Izumi et al. | |
| 6,294,000 B1 | * | 9/2001 | Klobucar | |
| 2001/0009124 A1 | * | 7/2001 | Suzuki et al. | |

FOREIGN PATENT DOCUMENTS

| | | | |
|---|---|---|---|
| DE | 39 02 977 A1 | | 8/1989 |
| EP | 0 450 888 A1 | | 10/1991 |
| GB | 2178976 | * | 2/1987 |
| JP | 54-19548 | * | 2/1979 |
| JP | 57-28936 | * | 2/1982 |
| JP | 58-88543 | * | 5/1983 |
| JP | 60-102919 | * | 6/1985 |
| JP | 62-976626 | * | 5/1987 |
| JP | 5-115737 | * | 5/1993 |
| JP | 6-47239 | * | 2/1994 |
| JP | 6-91128 | | 4/1994 |

* cited by examiner

Primary Examiner—Duane S. Smith
(74) Attorney, Agent, or Firm—Oblon, Spivak, McClelland, Maier & Neustadt, P.C.

(57) ABSTRACT

A decarbonating apparatus has a dehumidifying section for adsorbing humidity contained in waste gas and a decarbonating section for adsorbing $CO_2$ contained in the dehumidified waste gas. The decarbonating section includes a decarbonating drum rotor loaded with a $CO_2$ adsorbent having a honeycomb structure and arranged so as to adsorb $CO_2$ contained in the waste gas, a heated gas supply pipe for supplying a heated gas so as to desorb $CO_2$ adsorbed by the $CO_2$ adsorbent, a purge gas supply pipe for supplying a purge gas so as to purge desorbed $CO_2$, and a cooling gas supply pipe for supplying a cooling gas so as to regenerate the $CO_2$ adsorbent. The decarbonating drum rotor is rotated to successively pass through the adsorption region, the desorption region, the purging region, and the regeneration region.

12 Claims, 8 Drawing Sheets

METHOD FOR DECARBONATING WASTE GAS AND DECARBONATING APPARATUS

CROSS-REFERENCE TO RELATED APPLICATIONS

This application is based upon and claims the benefit of priority from the prior Japanese Patent Application No. 2000-015892, filed Jan. 25, 2000 the entire contents of which are incorporated herein by reference.

BACKGROUND OF THE INVENTION

The present invention relates to a method and apparatus for continuously adsorbing and removing $CO_2$ from waste gas discharged from a boiler of a thermal power plant or from a combustion furnace of an incinerator.

In order to prevent global warming, it is required to regulate release of $CO_2$ (carbon dioxide) gas, which is a greenhouse effect gas, into the atmosphere. One of methods of suppressing the release of the carbon dioxide gas into the atmosphere is to decarbonate waste gas from a thermal power plant or the like by physical adsorption before the waste gas is released into the atmosphere.

An apparatus for physically adsorbing carbon dioxide gas contained in waste gas having four adsorption towers loaded with an adsorbent, which are operated in parallel, is known to the art. In this case, a granular adsorbent or an adsorbent of honeycomb structure is loaded in each adsorption tower. In the apparatus, supply of waste gas at a low pressure and low temperature, carbon dioxide adsorption under pressure, carbon dioxide desorption by heating, and recovery of desorbed carbon dioxide under a reduced pressure are successively repeated in these four adsorption towers so as to carry out the carbon dioxide adsorption and the regeneration of the adsorbent continuously. However, the conventional apparatus is defective in that the apparatus includes four adsorption towers and, thus, requires a large site.

Japanese Patent Disclosure (Kokai) No. 6-91128 discloses another apparatus for physically adsorbing and removing carbon dioxide contained in waste gas. In this apparatus, waste gas of a low temperature and a high pressure and a regenerating gas of a high temperature and a low pressure are allowed to flow counter-currently through a drum rotor loaded with a granular adsorbent. The drum is rotated while allowing these gases to flow through it so as to carry out continuously adsorption of carbon dioxide gas contained in the waste gas and desorption of carbon dioxide gas adsorbed by the adsorbent.

However, in this apparatus, the waste gas itself having a low temperature and a high pressure is used for cooling the adsorbent. Therefore, carbon dioxide gas within the waste gas is unlikely to be adsorbed until the adsorbent heated by the regenerating gas of a high temperature is cooled sufficiently, leading to the defect that the recovery rate of carbon dioxide gas is low. Also, since the flow rate of the waste gas is markedly lowered in the case of using a granular adsorbent, it is necessary to introduce the entire amount of the waste gas from a flue into the apparatus for processing the waste gas. In addition, in order to prevent the granular adsorbent from being moved and distributed unevenly in accordance with rotation of the drum, it is necessary to arrange a plurality of partitioned chambers within the drum, leading to a complex construction of the apparatus.

BRIEF SUMMARY OF THE INVENTION

An object of the present invention is to provide a decarbonating apparatus simple in construction, not requiring a large space, and capable of continuously recovering carbon dioxide gas from waste gas with a high recovery efficiency.

According to the present invention, there is provided a method for decarbonating waste gas, comprising steps of: rotating a drum rotor loaded with a $CO_2$ adsorbent having a honeycomb structure; allowing the waste gas to flow through a region of the drum rotor so as to permit $CO_2$ contained in the waste gas to be adsorbed by the $CO_2$ adsorbent; supplying a heated gas to a region of the drum rotor so as to desorb $CO_2$ from the $CO_2$ adsorbent; and supplying a cooled gas to a region of the drum rotor so as to regenerate the $CO_2$ adsorbent, wherein these steps are performed simultaneously so as to permit the $CO_2$ adsorbent within the rotating drum rotor to be subjected successively to the $CO_2$ adsorption step, the $CO_2$ desorption step and the regeneration step.

According to the present invention, there is provided a decarbonating apparatus, comprising: a drum rotor loaded with a $CO_2$ adsorbent having a honeycomb structure, the $CO_2$ adsorbent being arranged so as to adsorb $CO_2$ contained in waste gas that is allowed to flow through a region thereof; a heated gas supply pipe for supplying a heated gas to a region of the drum rotor so as to permit adsorbed $CO_2$ to be desorbed from the $CO_2$ adsorbent; a cooling gas supply pipe for supplying a cooling gas to a region of the drum rotor so as to regenerate the $CO_2$ adsorbent; a heated gas recovery pipe for recovering the heated gas that has flowed through the $CO_2$ adsorbent; and a cooling gas recovery pipe for recovering the cooling gas that has flowed through the $CO_2$ adsorbent, wherein the drum rotor is configured to rotate with successively passing through the adsorption region for adsorbing $CO_2$ contained in the waste gas, the desorption region to which the heated gas is supplied, and the regeneration region to which the cooling gas is supplied.

In the present invention, it is desirable to provide a purge region, for purging the $CO_2$ desorbed from the $CO_2$ adsorbent, between the desorption region and the regeneration region. It should be noted that the $CO_2$ desorbed from the $CO_2$ adsorbent by the heating gas can be removed to some extent accompanying with the heating gas. However, it is more desirable to employ purging with a purge gas for achieving removal of the desorbed $CO_2$ without fail.

Namely, according to another aspect of the present invention, there is provided a method for decarbonating waste gas, comprising steps of: rotating a drum rotor loaded with a $CO_2$ adsorbent having a honeycomb structure; allowing the waste gas to flow through a region of the drum rotor so as to permit $CO_2$ contained in the waste gas to be adsorbed by the $CO_2$ adsorbent; supplying a heated gas to a region of the drum rotor so as to desorb $CO_2$ from the $CO_2$ adsorbent; supplying a purge gas to a region of the drum rotor so as to purge $CO_2$ desorbed from the $CO_2$ adsorbent; and supplying a cooling gas to a region of the drum rotor so as to regenerate the $CO_2$ adsorbent, wherein these steps are performed simultaneously so as to permit the $CO_2$ adsorbent within the rotating drum rotor to be subjected successively to the $CO_2$ adsorption step, the $CO_2$ desorption step, the $CO_2$ purging step and the regeneration step.

A decarbonating apparatus for carrying out the method described above comprises: a drum rotor loaded with a $CO_2$ adsorbent having a honeycomb structure, the $CO_2$ adsorbent being arranged so as to adsorb $CO_2$ contained in waste gas that is allowed to flow through a region thereof; a heated gas supply pipe for supplying a heated gas to a region of the drum rotor so as to permit adsorbed $CO_2$ to be desorbed from the $CO_2$ adsorbent; a purge gas supply pipe for supplying a purge gas to a region of the drum rotor so as to purge $CO_2$ desorbed from the $CO_2$ adsorbent; a cooling gas supply pipe for supplying a cooling gas to a region of the drum rotor so as to regenerate the $CO_2$ adsorbent; a heated gas recovery pipe for recovering the heated gas that has flowed through the $CO_2$ adsorbent; a purge gas/$CO_2$ recovery pipe for recovering the purge gas that has flowed through the $CO_2$ adsorbent and $CO_2$ purged from the $CO_2$ adsorbent; and a cooling gas recovery pipe for recovering the cooling gas that has flowed through the $CO_2$ adsorbent, wherein the drum rotor is configured to rotate with successively passing through the adsorption region for adsorbing $CO_2$ contained in the waste gas, the desorption region to which the heated gas is supplied, the purging region to which the purge gas is supplied, and the regeneration region to which the cooling gas is supplied.

In the present invention, it is desirable to provide a dehumidifying section on the high temperature side of the decarbonating section. It should be noted that the $CO_2$ adsorbent adsorbs humidity in preference to $CO_2$. Therefore, if the waste gas contains humidity, the $CO_2$ recovery rate is lowered. Therefore, when $CO_2$ is adsorbed by the $CO_2$ adsorbent after the waste gas is dehumidified, it makes possible to increase the $CO_2$ recovery rate.

Namely, according to still another aspect of the present invention, there is provided a method for decarbonating waste gas, comprising steps of: rotating a dehumidifying drum rotor loaded with a humidity adsorbent having a honeycomb structure and a decarbonating drum rotor loaded with a $CO_2$ adsorbent having a honeycomb structure, the drum rotors being arranged in series; allowing the waste gas to flow through a region of the dehumidifying drum rotor so as to permit humidity to be adsorbed by the humidity adsorbent, followed by allowing the dehumidified waste gas to flow through a region of the decarbonating drum rotor so as to permit $CO_2$ to be adsorbed by the $CO_2$ adsorbent; supplying a heated gas to a region of the dehumidifying drum rotor so as to desorb humidity from the humidity adsorbent, together with supplying a heated gas to a region of the decarbonating drum rotor so as to desorb $CO_2$ from the $CO_2$ adsorbent; supplying a purge gas to a region of the dehumidifying drum rotor so as to purge humidity desorbed from the humidity adsorbent, together with supplying a purge gas to a region of the decarbonating drum rotor so as to purge $CO_2$ desorbed from the $CO_2$ adsorbent; and supplying a cooled gas to a region of the dehumidifying drum rotor so as to regenerate the humidity adsorbent, together with supplying a cooled gas to a region of the decarbonating drum rotor so as to regenerate the $CO_2$ adsorbent, wherein these steps are performed simultaneously so as to permit the humidity adsorbent within the rotating dehumidifying drum rotor to be subjected successively to the humidity adsorption step, the humidity desorption step, the humidity purging step and the regeneration step and so as to permit the $CO_2$ adsorbent within the rotating decarbonating drum rotor to be subjected successively to the $CO_2$ adsorption step, the $CO_2$ desorption step, the $CO_2$ purging step and the regeneration step.

A decarbonating apparatus for carrying out the method described above comprises a dehumidifying section for adsorbing humidity contained in waste gas, and a decarbonating section for adsorbing $CO_2$ contained in the dehumidified waste gas, wherein the dehumidifying section includes: a dehumidifying drum rotor loaded with a humidity adsorbent of a honeycomb structure, the humidity adsorbent being arranged so as to adsorb humidity contained in the waste gas that is allowed to flow through a region thereof; a heated gas supply pipe for supplying a heated gas to a region of the dehumidifying drum rotor so as to permit adsorbed humidity to be desorbed from the humidity adsorbent; a purge gas supply pipe for supplying a purge gas to a region of the dehumidifying drum rotor so as to purge humidity desorbed from the humidity adsorbent; a cooling gas supply pipe for supplying a cooling gas so as to regenerate the humidity adsorbent; a heated gas recovery pipe for recovering the heated gas that has flowed through the humidity adsorbent; a purge gas/humidity recovery pipe for recovering the purge gas that has flowed through the humidity adsorbent and humidity desorbed from the humidity adsorbent; and a cooling gas recovery pipe for recovering the cooling gas that has flowed through the humidity adsorbent; in which the dehumidifying drum rotor is configured to rotate with successively passing through the adsorption region for adsorbing humidity contained in the waste gas, the desorbing region to which a heated gas is supplied, the purging region to which the purge gas is supplied, and the regeneration region to which the cooling gas is supplied, and wherein the decarbonating section includes: a decarbonating drum rotor loaded with a $CO_2$ adsorbent having a honeycomb structure, the $CO_2$ adsorbent being arranged so as to adsorb $CO_2$ contained in the waste gas that is allowed to flow through a region thereof; a heated gas supply pipe for supplying a heated gas to a region of the decarbonating drum rotor so as to permit adsorbed $CO_2$ to be desorbed from the $CO_2$ adsorbent; a purge gas supply pipe for supplying a purge gas to a region of the decarbonating drum rotor so as to purge $CO_2$ desorbed from the $CO_2$ adsorbent; a cooling gas supply pipe for supplying a cooling gas to a region of the decarbonating drum rotor so as to regenerate the $CO_2$ adsorbent; a heated gas recovery pipe for recovering the heated gas that has flowed through the $CO_2$ adsorbent; a purge gas/$CO_2$ recovery pipe for recovering the purge gas that has flowed through the $CO_2$ adsorbent and $CO_2$ purged from the $CO_2$ adsorbent; and a cooling gas recovery pipe for recovering the cooling gas that has flowed through the $CO_2$ adsorbent; in which the decarbonating drum rotor is configured to rotate with successively passing through the adsorption region for adsorbing $CO_2$ contained in the waste gas, the desorption region to which the heated gas is supplied, the purging region to which the purge gas is supplied, and the regeneration region to which the cooling gas is supplied.

In the above decarbonating apparatus, it is desirable to fix the dehumidifying drum rotor and the decarbonating drum rotor to the same shaft so as to be rotated at the same speed in order to increase the $CO_2$ recovery rate. Also, in order to increase cooling effect on the adsorbent performed by the cooling gas, it is desirable that the heated gas and the purge gas are allowed to flow concurrently with the waste gas, and the cooling gas be allowed to flow counter-currently to the waste gas. Further, in order to decrease energy for recovery, it is desirable to arrange heat exchangers for performing heat exchange between each of the heating gases supplied to the dehumidifying drum rotor and the decarbonating drum rotor with the waste gas on a high temperature side.

The decarbonating apparatus of the present invention is arranged in, for example, a flue of waste gas. In this case, each of the dehumidifying drum rotor and the decarbonating drum rotor is mounted such that a part the drum rotor is positioned within the flue, with the other part positioned outside the flue. Also, the heated gas supply pipe, the purge gas supply pipe, the cooling gas supply pipe for each of the drum rotors and the recovery pipes corresponding to these supply pipes are arranged outside the flue.

Also, it is possible for the dehumidifying drum rotor and the decarbonating drum rotor, which are included in the decarbonating apparatus of the present invention, to be connected directly to a low temperature side of an air heater comprising a rotor for performing heat exchange between the waste gas discharged from a combustion furnace and combustion air to be supplied to the combustion furnace.

Further, the present invention provides an air heater having the decarbonating apparatus of the present invention integrally incorporated therein. Namely, the air heater of the present invention comprises an air heater main unit including a rotor performing heat exchange between the waste gas discharged from a combustion furnace and combustion air to be supplied to the combustion furnace, and a dehumidifying section for adsorbing humidity contained in the waste gas and a decarbonating section for adsorbing $CO_2$ contained in the dehumidified waste gas, which are incorporated in the low temperature section of the air heater main unit. The dehumidifying section and the decarbonating section have similar constructions to those described in conjunction with the above decarbonating apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described with reference to the accompanying drawings.

Figure 1A:
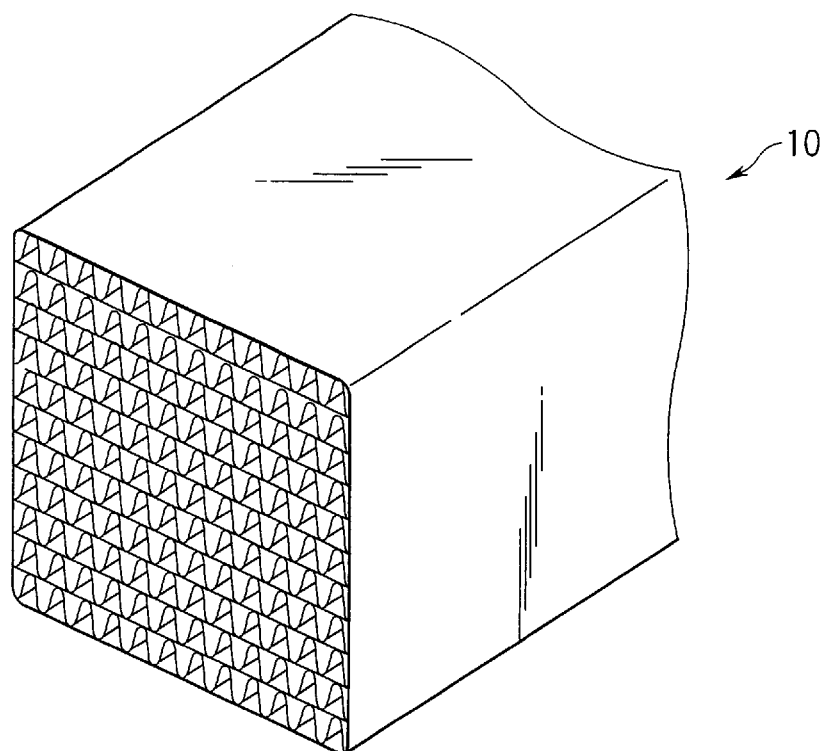
FIG. 1A is a perspective view showing an example of a honeycomb-shaped adsorbent of the present invention.
Figure 1B:
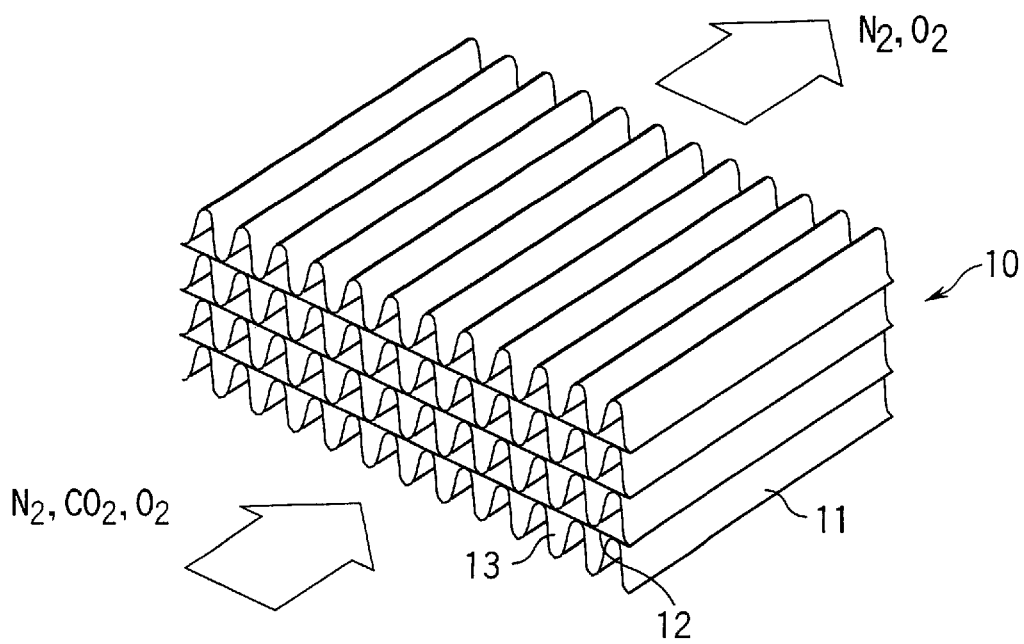
FIG. 1B is a perspective view showing in a magnified fashion a part of the adsorbent shown in FIG. 1A.

The adsorbent of a honeycomb structure used in the present invention is an adsorbent having a large number of through-holes extending in parallel to form a honeycomb-shaped cross section. FIG. 1A is a perspective view showing an example of an adsorbent 10 having a honeycomb structure according to the present invention, and FIG. 1B shows in a magnified fashion a region of the adsorbent shown in FIG. 1A. The adsorbent 10 of the honeycomb structure is prepared by laminating a plurality of waved adsorption sheets 11 with a plate-like adsorption sheet 12 interposed therebetween. An adsorbent is dispersed in the adsorption sheet. Zeolite used as an adsorbent provides a $CO_2$ adsorbent. Also, zeolite, an activated alumina, etc., provide a humidity adsorbent. FIG. 1A shows an adsorbent having an entire shape of a column having a rectangular cross section. If the through-holes 13 of the adsorbent 10 are arranged along the waste gas stream, the adsorption sheet adsorbs a specified component of the gas flowing through the through-hole 13. FIG. 1B shows that waste gas containing $N_2$, $CO_2$ and $O_2$ is allowed to flow through the through holes 13 so as to permit $CO_2$ alone to be adsorbed selectively.

The adsorbent of the honeycomb structure is featured in that the pressure loss of the gas flowing through the adsorbent is very small even if the waste gas flow rate is high, and that the adsorbed substance is desorbed rapidly. Therefore, even if the adsorbent is inserted into the flue of a thermal power plant through which the waste gas flows at a high speed, e.g., about 10 m/sec, the adsorbent has an advantage that the flow rate of the waste gas is not lowered.

In the present invention, the adsorbent of the honeycomb structure is loaded in a drum rotor such that the through-holes 13 extend along the flow of the waste gas. The drum rotor is mounted to a central rotary shaft so as to be rotated about the rotary shaft. Since the adsorbent of the honeycomb structure is shaped like a column having a rectangular cross section as described above, it is possible to load the adsorbents within the drum rotor in a manner to eliminate the clearance between adjacent adsorbents. It follows that, unlike the conventional granular adsorbent, the adsorbents of the honeycomb structure are not moved and distributed unevenly even if the drum rotor is rotated. As a result, it is unnecessary to provide partitioned chambers within the drum rotor so as to simplify the construction of the apparatus. Also, since the adsorbents are not moved nor distributed unevenly, the drum rotor may be rotated about a horizontal rotary shaft, together with may be rotated about a vertical rotary shaft.

Figure 2:
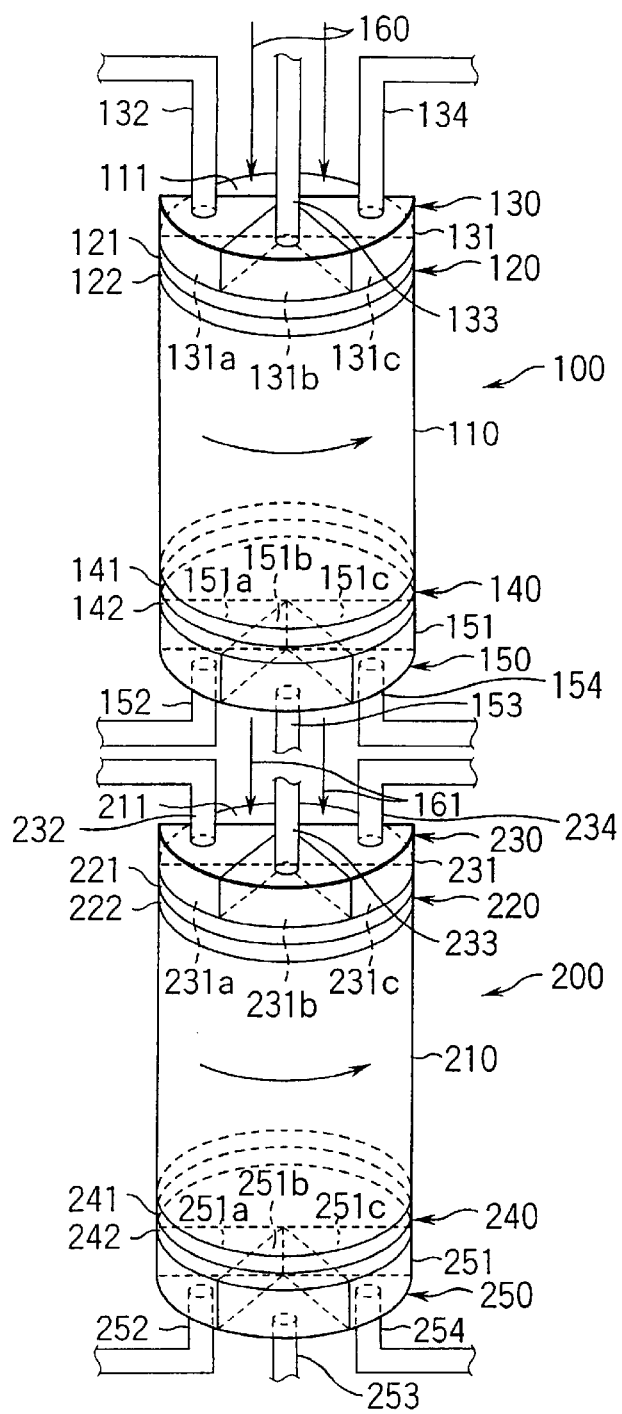
FIG. 2 is a perspective view schematically showing a decarbonating apparatus of the present invention.

FIG. 2 is a perspective view schematically showing a decarbonating apparatus of the present invention. The apparatus shown in FIG. 2 comprises a dehumidifying section 100 and a decarbonating section 200. A drum rotor 110 for the dehumidifying section 100 and a drum rotor 210 for the decarbonating section have the same diameter and are mounted to the same shaft and, thus, these drum rotors 110 and 210 are rotated at the same speed so as to carry out efficiently both dehumidification and decarbonation.

The dehumidifying section 100 comprises the dehumidifying drum rotor 110 loaded with a humidity adsorbent, a first piping section 130 mounted to an edge surface on the high temperature side of the drum rotor 110 with a sealing member 120 interposed therebetween, and a second piping section 150 mounted to the edge surface on the low temperature side of the drum rotor 110 with a sealing member 140 interposed therebetween. The sealing member 120 consists of two seal members 121, 122. These sealing members are rotatable in an airtight manner to each other. Also, the sealing member 140 consists of two sealing members 141, 142. These sealing members are rotatable in an airtight manner to each other. The particular construction permits rotating the drum rotor 110 alone with the first piping section 130 and the second piping section 150 held stationary.

The first piping section 130 comprises a first frame section 131, which is a semicircular frame occupying half the upper surface of the drum rotor 110. The first frame section 131 is divided into three fan-shaped sub-frames 131a, 131b and 131c. A heating gas supply pipe 132, a purge gas supply pipe 133 and a cooling gas recovery pipe 134 are arranged on the upper portions of these sub-frame sections 131a, 131b and 13c, respectively. As described herein later, a guide shaped to conform to the shape of each sub-frame section is mounted to the tip of each supply pipe/recovery pipe so as to supply/recover the gas while preventing the gas leakage. Each sub-frame region defines a desorption region, a purging region and a regeneration region in the dehumidifying drum rotor. Also, the remaining upper surface 111 of the drum rotor 110 on which the first frame section 131 is not arranged provides an adsorption region to which the waste gas 160 is supplied.

The second piping section 150 comprises a second frame section 151, which is a semicircular frame occupying half the lower surface of the drum rotor 110. The second frame section 151 is divided into fan-shaped sub-frame sections 151a, 151b and 151c. These sub-frame sections of the second piping section 151 are formed to face the sub-frame sections of the first piping section 131 described above. A heated gas recovery pipe 152, a purge gas/humidity recovery pipe 153 and a cooling gas supply pipe 154 are arranged below the sub-frames 151a, 151b and 151c, respectively. Further, a guide shaped to conform to the shape of each sub-frame section is mounted to the tip of each of these pipes.

The decarbonating section 200, which is similar in construction to the dehumidifying section 100, comprises a decarbonating drum rotor 210 loaded with a $CO_2$ adsorbent of a honeycomb structure, a third piping section 230 arranged on an upper surface of the drum rotor 210 with a sealing member 220 interposed therebetween, and a fourth piping section 250 arranged on the lower surface of the drum rotor 210 with a sealing member 240 interposed therebetween. The sealing member 220 consists of two sealing members 221 and 222, which are rotatable in an airtight manner to each other. On the other hand, the sealing member 240 consists of two sealing members 241 and 242, which are rotatable in an airtight manner to each other. It follows that it is possible to rotate the drum rotor 210 alone with the third piping section 230 and the fourth piping section 250 held stationary.

The third piping section 230 comprises a third frame section 231, which is a semicircular frame occupying half the upper surface of the drum rotor 210. The third frame section 231 is divided into fan-shaped three sub-frames 231a, 231b and 231c. A heating gas supply pipe 232, a purge gas supply pipe 233 and a cooling gas recovery pipe 234 are arranged in upper portions of these sub-frame section 231a, 231b, and 231c, respectively. A guide having a shape to conform to the shape of the sub-frame section is mounted to the tip of each of these pipes. These sub-frame sections define a heating region, a purging region and a regeneration region in the decarbonating drum rotor 210. Also, the remaining upper surface 211 of the drum rotor 210, on which the third frame section 231 is not arranged, constitutes an adsorption region to which the waste gas 161 is supplied.

The fourth piping section 250 comprises a fourth frame section 251, which is a semicircular frame occupying half the lower surface of the drum rotor 210. The fourth frame section 251 is divided into three fan-shaped sub-frame sections 251a, 251b and 251c. These sub-frame sections of the fourth piping section 251 are formed to face the sub-frame sections of the third piping section 231 described above. A heated gas recovery pipe 252, a purge gas/$CO_2$ recovery pipe 253 and a cooling gas supply pipe 254 are arranged below the sub-frames 251a, 251b and 251c, respectively. Further, a guide shaped to conform to the shape of each sub-frame section is mounted to the tip of each of these pipes.

Figure 3:
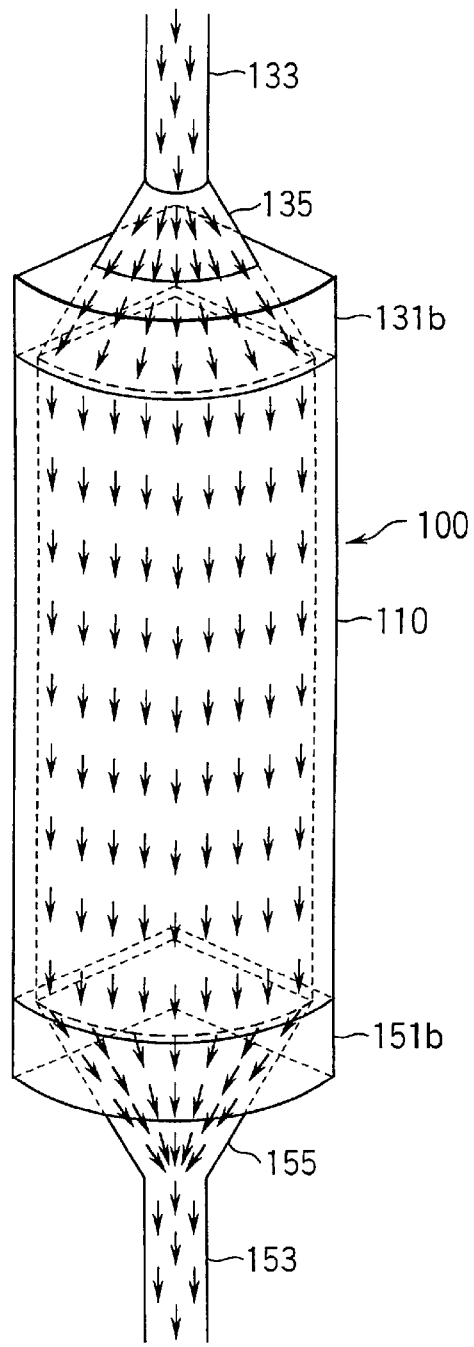
FIG. 3 is a perspective view schematically showing a guide for a pipe.

As described above, it is desirable for each of the supply pipe and the recovery pipe to be equipped with a hood-like guide at the tip so as to eliminate the leakage of the gas supplied to and recovered from the adsorbent. FIG. 3 is a perspective view schematically showing an example of a guide for the pipe used in the present invention. Only the purging region of the dehumidifying section 100 of the decarbonating apparatus shown in FIG. 2 is shown in the drawing of FIG. 3, while omitting the sealing members 120 and 140. A guide 135 at the tip of the purge gas supply pipe 133 has a fan-shaped opening slightly smaller than the fan-shaped sub-frame section 131b. Since the purge gas is spread in a fan shape in accordance with the shape of the guide 135, the purge gas can be supplied into a purge region 131b without leakage. On the other hand, a guide 155 at the tip of the purge gas/humidity recovery pipe 153 is a fan-shaped opening substantially equal in size to the fan-shaped sub-frame section 151b. Therefore, the recovery pipe 153 is capable of recovering the purge gas and humidity discharged from the purge region 151b without leakage. The particular constructions can be applied to all gas supply pipe/recovery pipe shown in FIG. 2.

Figure 4:
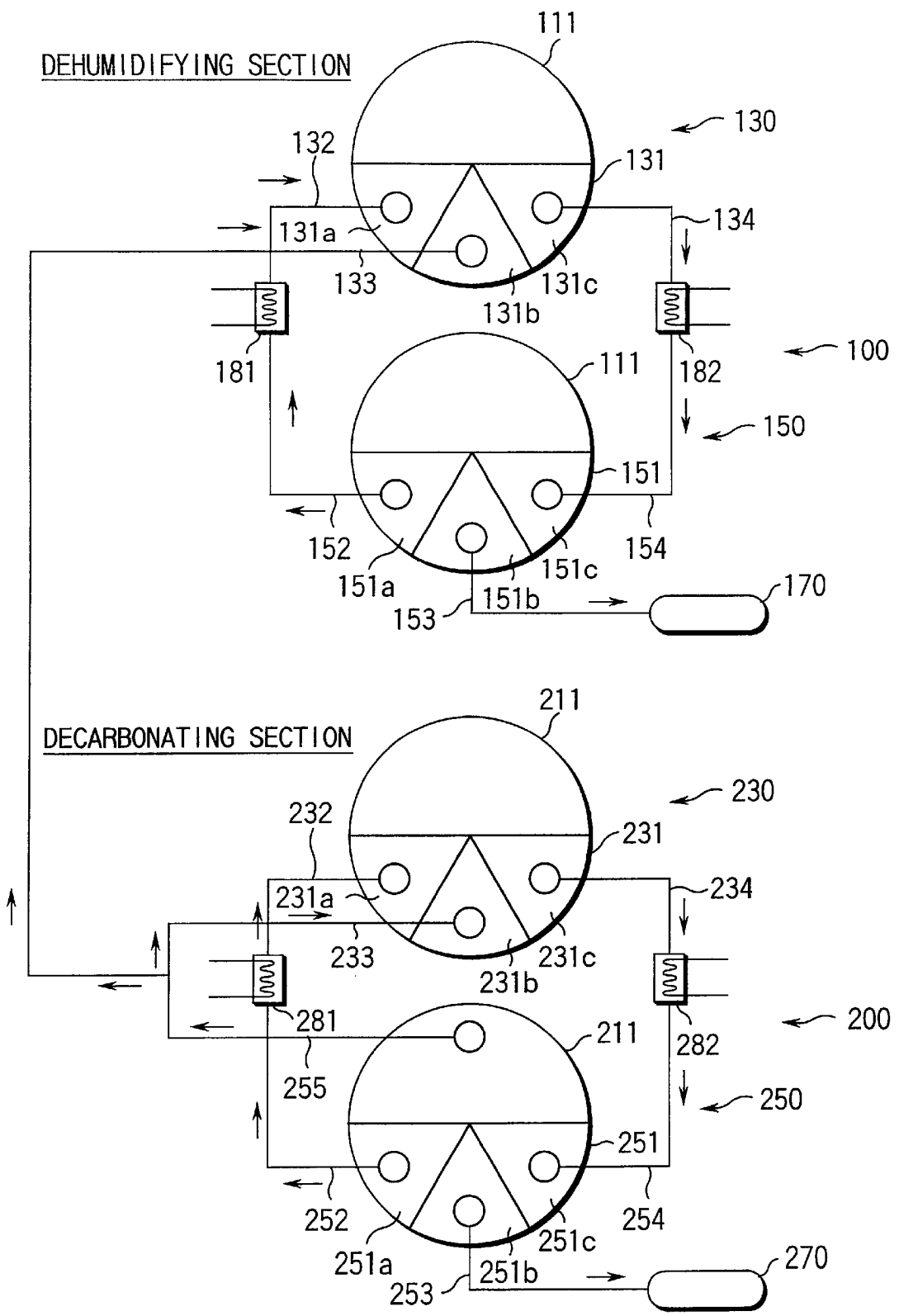
FIG. 4 schematically shows piping in the decarbonating apparatus of the present invention.

FIG. 4 shows piping of the decarbonating apparatus according to the present invention. The first and second piping sections 130, 150 of the dehumidifying section 100 are shown in the upper section of FIG. 4, with the third and fourth piping sections 230, 250 of the decarbonating section 200 being shown in the lower section of FIG. 4. The operation of the decarbonating apparatus of the present invention will be described with reference to FIGS. 2 and 4. It should be noted that the drum rotor 110 of the dehumidifying section 100 and the drum rotor 210 of the decarbonating section are rotated at the same rotating speed.

In the dehumidifying section 100, the waste gas is introduced through the adsorption region 111 on the upper surface of the drum rotor 110 into the drum rotor 110. While the waste gas passes through the drum rotor 110, humidity is removed from the waste gas by the humidity adsorbent and the waste gas is discharged to the outside through the lower surface of the drum rotor 110.

In accordance with rotation of the drum rotor 110, the humidity adsorbent having humidity adsorbed thereon is moved to reach a heating region. In the heating region, a heating gas supplied from the heating gas supply pipe 132 is introduced into the drum rotor 110 through the sub-frame section 131a on the upper surface of the drum rotor 100. While the heating gas passes through the drum rotor 110, humidity adsorbed by the humidity adsorbent is desorbed from the adsorbent. Then, the heating gas is discharged to the outside through the sub-frame section 151a on the lower surface of the drum rotor 110. The heating gas recovery pipe 152 is connected to the heating gas supply pipe 132 via heat exchanger 181. The heating gas heated by the heat exchanger 181 is circulated for reuse. It is desirable for the heat exchanger 181 to be constructed such that the heating gas is heat-exchanged with the waste gas on the high temperature side. In this construction, it is unnecessary to provide an additional heating apparatus for heating again the heating gas. Therefore, the particular construction is advantageous in terms of space saving and energy saving.

In accordance with rotation of the drum rotor 110, the humidity adsorbent having humidity desorbed is moved to reach the purging region. In the purging region, a purge gas supplied from the purge gas supply pipe 133 is introduced into the drum rotor 110 through the sub-frame section 131b on the upper surface of the drum rotor 110. While the purge gas passes through the drum rotor 110, humidity desorbed from the humidity adsorbent is purged, and the purge gas is discharged to the outside through the sub-frame section 151b on the lower surface of the drum rotor 110. The purge gas/humidity recovery pipe 153 is connected to a dehumidifying tank 170, and the recovered humidity is housed in a tank 170.

The humidity adsorbent having the humidity removed by the rotation of the drum rotor 110 is moved to reach the regeneration region. In the regeneration region, a cooling gas supplied through the cooling gas supply pipe 154 is introduced into the drum rotor 110 through the sub-frame section 151c on the lower surface of the drum rotor 110. While the cooling gas passes through the drum rotor 110, the humidity adsorbent is cooled so as to restore adsorption ability. Then, the cooling gas is discharged to the outside through the sub-frame section 131c on the upper surface of the drum rotor 110. In the present invention, the cooling gas is allowed to flow counter-currently to the other gases in order to improve cooling effect. The cooling gas recovery pipe 134 is connected to the cooling gas supply pipe 154 via heat exchanger 182 such that the cooling gas cooled by the heat exchanger 182 is circulated for reuse.

In accordance with rotation of the drum rotor 110, the humidity adsorbent is moved to reach the adsorption region. In the adsorption region, the humidity adsorbent regenerated by the sufficient cooling is brought into contact with the waste gas, with the result that humidity in the waste gas is adsorbed promptly on the humidity adsorbent. As described above, the humidity adsorbent is successively subjected to the humidity adsorption step, the humidity desorption step, the humidity purging step and the regeneration step, and thus removal of humidity from the waste gas and recovery of humidity are continuously carried out.

In the decarbonating section 200, the waste gas dehumidified in the dehumidifying section 100 is introduced into the drum rotor 210 through the adsorption region 211 on the upper surface of the drum rotor 210. While the waste gas passes through the drum rotor 210, $CO_2$ contained in the waste gas is adsorbed by the $CO_2$ adsorbent, and the waste gas is discharged to the outside through the lower surface of the drum rotor 210.

In accordance with rotation of the drum rotor 210, the $CO_2$ adsorbent having $CO_2$ adsorbed thereon is moved to reach a heating region. In the heating region, the heating gas supplied from the heating gas supply pipe 232 is introduced into the drum rotor 210 through the sub-frame section 231a on the upper surface of the drum rotor 210. While the heating gas passes through the drum rotor 210, the $CO_2$ adsorbed by the $CO_2$ adsorbent is desorbed and, then, the heating gas is discharged to the outside through the sub-frame section 251a on the lower surface of the drum rotor 210. The heating gas recovery pipe 252 is connected to the heating gas supply pipe 232 via the heat exchanger 281. The heating gas heated by the heat exchanger 281 is circulated for reuse. It is desirable for the heat exchanger 281 to be constructed such that the heating gas is heat-exchanged with the waste gas on the high temperature side. In this construction, it is unnecessary to provide an additional heating apparatus for heating again the heating gas. Therefore, the particular construction is advantageous in terms of space saving and energy saving.

In accordance with rotation of the drum rotor 210, the $CO_2$ adsorbent having $CO_2$ desorbed is moved to reach a purging region. In the purging region, a purge gas supplied from the purge gas supply pipe 233 is introduced into the drum rotor 210 through the sub-frame section 231b on the upper surface of the drum rotor 210. While the purge gas passes through the drum rotor 210, the $CO_2$ desorbed from the $CO_2$ adsorbent is purged and, then, the purge gas is discharged to the outside through the lower surface of the drum rotor 210. The purge gas/$CO_2$ recovery pipe 253 is connected to a $CO_2$ recovery tank 270 such that the recovered $CO_2$ is housed in the tank 270.

In accordance with rotation of the drum rotor 210, the $CO_2$ adsorbent having $CO_2$ desorbed is moved to reach a regeneration region. In the regeneration region, a cooling gas supplied from the cooling gas supply pipe 254 is introduced into the drum rotor 210 through the sub-frame section 251c on the lower surface of the drum rotor 210. While the cooling gas passes through the drum rotor 210, the $CO_2$ adsorbent is cooled so as to restore adsorption ability. Then, the cooling gas is discharged to the outside through the sub-frame section 231c on the upper surface of the drum rotor 210. In the present invention, the cooling gas is allowed to flow counter-currently to the other gases in order to improve cooling effect. The cooling recovery pipe 234 is connected to the cooling gas supply pipe 254 via the heat exchanger 282. The cooling gas cooled by the heat exchanger 282 is circulated for reuse.

In accordance with rotation of the drum rotor 210, the $CO_2$ adsorbent is moved to reach an adsorption region. In the adsorption region, the $CO_2$ adsorbent regenerated by sufficient cooling is brought into contact with the waste gas, with the result that $CO_2$ contained in the waste gas is promptly adsorbed by the $CO_2$ adsorbent. In this fashion, the $CO_2$ adsorbent is successively subjected to the $CO_2$ adsorption step, the $CO_2$ desorption step, the $CO_2$ purging step, and the regeneration step, and thus removal of $CO_2$ from the waste gas and recovery of $CO_2$ are continuously performed, thereby achieving a high recovery rate of $CO_2$.

In the embodiment shown in FIG. 4, a part of the waste gas that has flowed through the adsorption region 211 of the drum rotor 210 of the decarbonating section 200 is supplied through the waste gas recovery pipe 255 into the purge gas supply pipe 133 of the dehumidifying section 100 and a purge gas supply pipe 233 of the decarbonating section 200, respectively. Since the waste gas after dehumidification and decarbonation is used again as the purge gas in the dehumidifying section 100 and the decarbonating section 200, it is unnecessary to provide an additional purge gas supply source. This is advantageous in terms of space saving and recovery energy saving.

As described above, the decarbonating apparatus of the present invention comprises a drum rotor loaded with an adsorbent of a honeycomb structure, pipes, etc., and, thus, is simple in construction. Since the apparatus of the present invention can be mounted to the route of the waste gas, a required space can be markedly diminished and energy for recovery can be lowered, compared with the conventional apparatus comprising four adsorption towers.

Figure 5A:
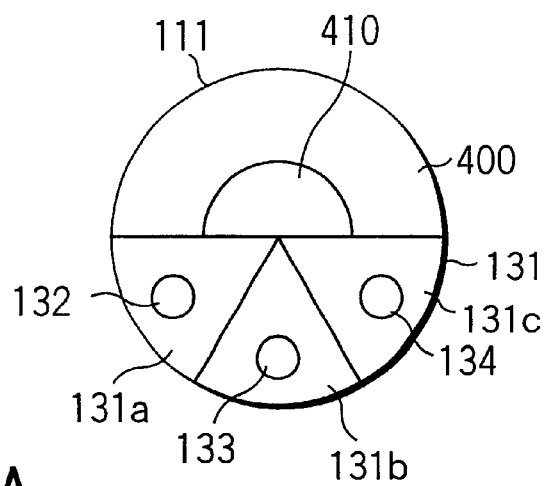
FIG. 5A is a plan view showing a shielding member used in the present invention.
Figure 5B:
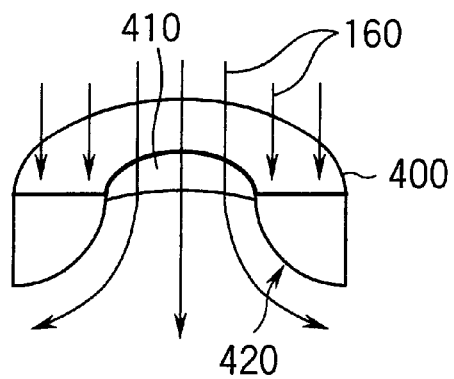
FIG. 5B is a perspective view showing the shielding member shown in FIG. 5A.
Figure 5C:
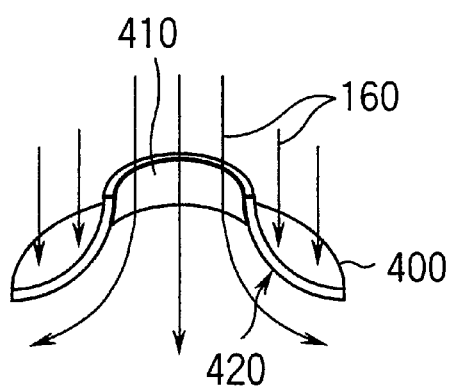
FIG. 5C is a perspective view showing the shielding member shown in FIG. 5A.

In the present invention, it is possible to arrange a shielding member serving to limit the flow rate of the waste gas above the adsorption region of the drum rotor. If the $CO_2$ recovery rate from the waste gas is lowered by limiting the flow rate of the waste gas, it is possible to lower the operating cost of the apparatus required for removing and recovering $CO_2$. FIG. 5 shows a shielding member used in the present invention. In this case, the shielding member is applied to the first piping section 130 of the decarbonating apparatus shown in FIG. 2. FIG. 5A is a plan view showing the state that the shielding member is mounted to the first piping section 130, and FIGS. 5B and 5C are perspective views each schematically showing the shielding member.

As shown in FIG. 5A, the shielding member 400 has an annular shape with the opening 410 formed in the central portion. The shielding member 400 is arranged in the adsorption region 111 of the drum rotor to which waste gas is supplied. Since only the waste gas passing through the opening 410 passes through the adsorbent arranged within the drum rotor, the $CO_2$ recovery rate can be set arbitrarily. As shown in FIG. 5B, the inner surface of the opening 410 of the shielding member 400 forms a guide plane 420 for controlling the flow of the waste gas 160. The guide plane 420 is curved to permit the waste gas 160 passing through the opening 410 to be spread over the entire surface of the adsorption region 111. This construction permits utilizing the entire surface of the adsorption region for the adsorption of $CO_2$ regardless of the flow rate of the waste gas so as to utilize the adsorbent effectively. In the shielding member 400 shown in FIG. 5C, the outer surface of the shielding member 400 facing the waste gas 160 also forms a curved plane similar to that of the guide plane 420 so as to lower the resistance to the waste gas 160 that does not flow through the opening 410, compared with the shielding member shown in FIG. 5B.

As described above, the decarbonating apparatus of the present invention utilizes an adsorbent having a honeycomb structure. Thus, the pressure loss of the gas passing through the adsorbent is very small even if the waste gas flows through the adsorbent at a very high speed. It follows that the arranging position of the decarbonating apparatus of the present invention is not particularly limited within a flue.

FIGS. 6A to 6F show that the decarbonating apparatus of the present invention is mounted to a waste gas flue.

Figure 6A:
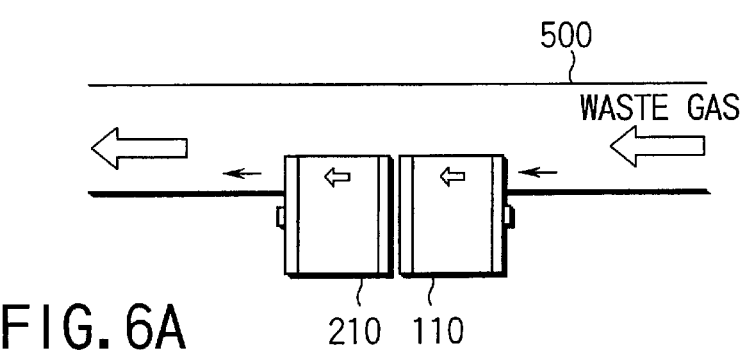
FIG. 6A schematically shows a decarbonating apparatus of the present invention mounted to a flue.
Figure 6B:
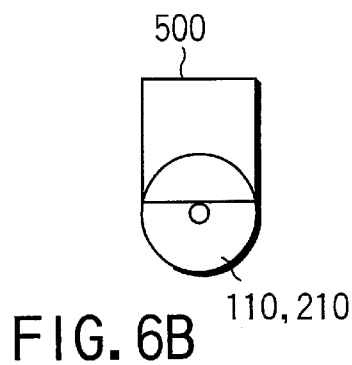
FIG. 6B is a side view of the system shown in FIG. 6A.

Specifically, FIGS. 6A and 6B cover the case where the decarbonating apparatus shown in FIG. 2 is mounted to a flue 500. In this case, about half the drum rotor 110 of the dehumidifying section and about half the drum rotor 210 of the decarbonating section, i.e., the semicircular portions shown in FIG. 6B, are arranged within the flue 500. On the other hand, the piping section (not shown) is arranged outside the flue. Space saving can be achieved by arranging the decarbonating apparatus directly to the flue 500 in this fashion. In this case, a ratio of the cross sectional area of the drum rotor arranged within the flue (cross sectional areas of the adsorption region) to the cross sectional area of the flue provides the recovery rate of $CO_2$ from the waste gas. The recovery rate is increased with increase in the ratio of the cross sectional area noted above. In this case, however, the operating cost of the apparatus for adsorption/recovery of $CO_2$ is also increased with increase in the $CO_2$ recovery rate. It follows that it is desirable to determine the cross sectional area of the drum rotor positioned within the flue in view of both the recovery rate and the operating cost.

Figure 6C:
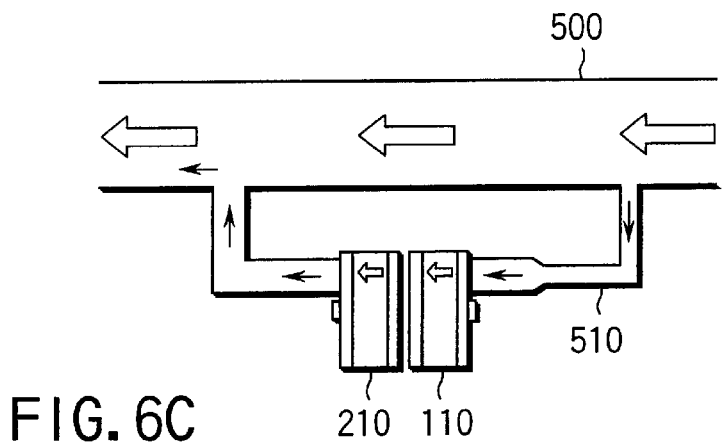
FIG. 6C schematically shows another example of a decarbonating apparatus of the present invention mounted to a flue.
Figure 6D:
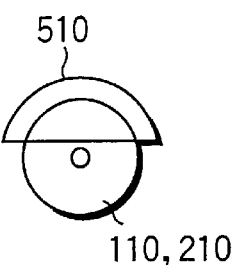
FIG. 6D is a side view of the system shown in FIG. 6C.

FIGS. 6C and 6D show the case where the decarbonating apparatus is mounted to a branched flue 510 branched from the flue 500. In the drawings, the branched flue 510 is designed to have a semicircular cross section, and about half of each of the drum rotors 110 and 210 (semicircular portion) is arranged within the branched flue 510. In this case, $CO_2$ recovery rate is adjusted mainly by the ratio of the cross sectional area of the branched flue 510 to the cross sectional area of the flue 500. Within the branched flue 510, a ratio of the cross sectional area of the drum rotor to the cross sectional area of the branched flue 510 is set at a high value in order to increase the $CO_2$ recovery rate.

Figure 6E:
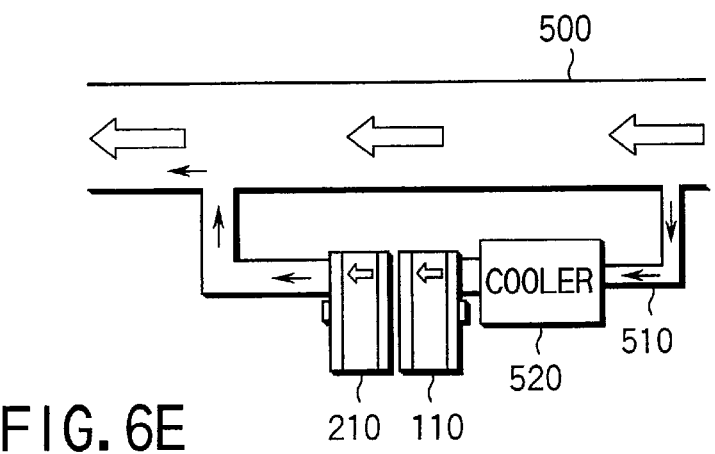
FIG. 6E schematically shows still another example of a decarbonating apparatus of the present invention mounted to a flue.
Figure 6F:
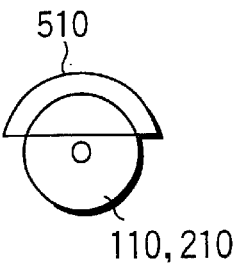
FIG. 6F is a side view of the system shown in FIG. 6E.

FIGS. 6E and 6F show a case where a water-cooling type cooler 520 is mounted on the high temperature side of the dehumidifying section within the branched flue 510 in addition to the construction shown in FIGS. 6C and 6D. The temperature of the waste gas in the flue 500 shown in FIG. 6A and in the branched flue 510 shown in FIG. 6C is about 110° C. However, if the cooler 520 is mounted as shown in FIG. 6E, the temperature of the waste gas can be lowered to, for example, 40° C., making it possible to further improve $CO_2$ recovery rate.

Figure 7:
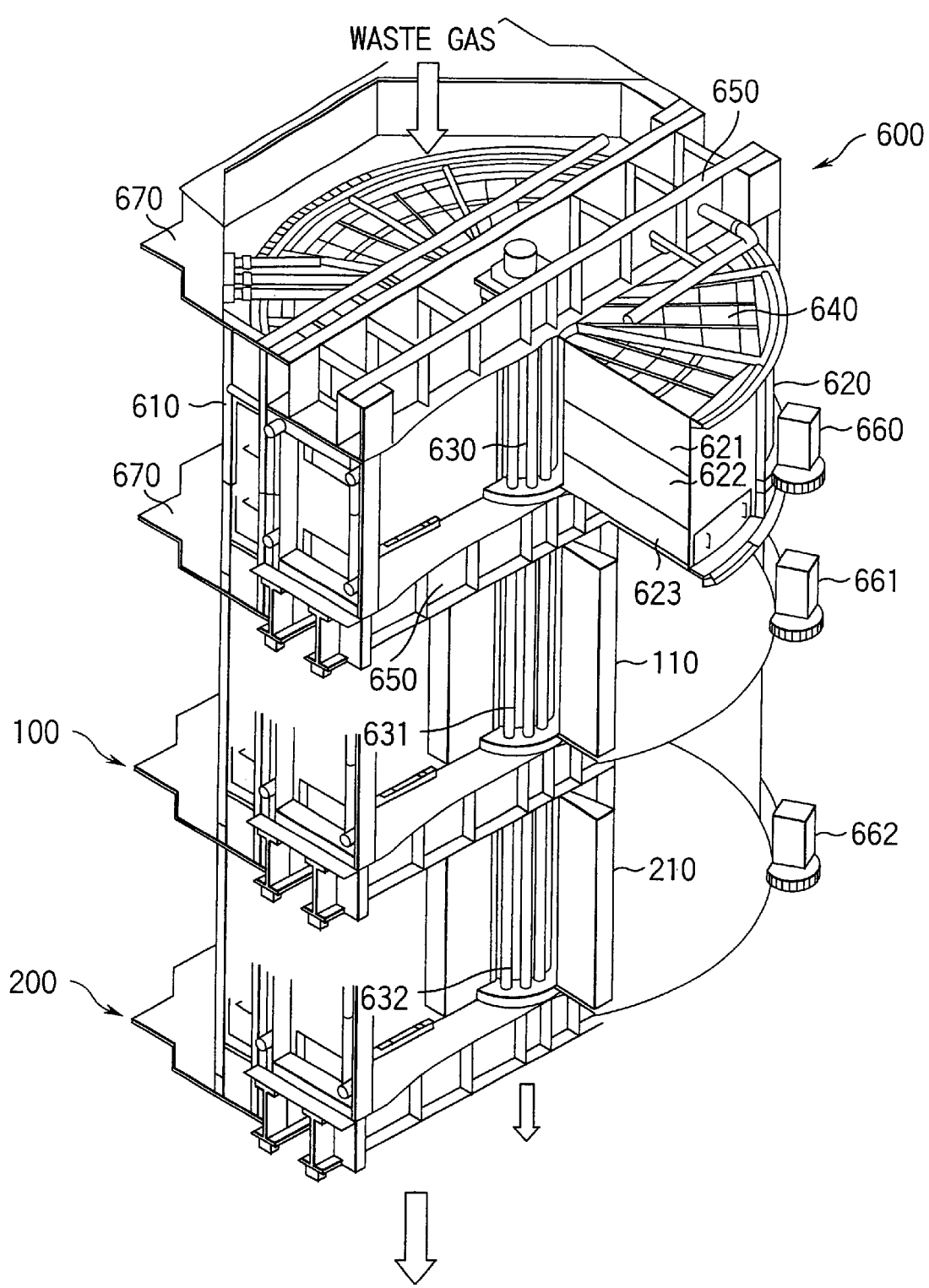
FIG. 7 is a perspective view showing a case where a decarbonating apparatus of the present invention is mounted directly to an air heater.

FIG. 7 shows an embodiment in which the decarbonating apparatus of the present invention is mounted on the low temperature side of an air heater 600. In the air heater 600, heat exchange is performed between waste gas discharged from a combustion furnace and combustion air supplied to the combustion furnace, so as to preheat the combustion air. As shown in FIG. 7, the air heater 600 is constructed as described below. Specifically, a rotor 620 for heat exchange is housed in a side pedestal 610 of a substantially cylindrical outer frame. The rotor 620 comprises a rotor post 630 forming the central shaft and a meshed heating element 640 made of a metal and arranged in a columnar arrangement around the rotor post 630. Arch members 650 facing each other and bridging the upper and lower openings of the side pedestal 610 into two halves are arranged in the upper and lower sides of the side pedestal 610, and a bearing is arranged in the central portion of each of these arch members 650. The rotor posts 630 are inserted into these bearings so as to be supported in a vertical direction. A rotor driving apparatus 660 drives the rotor 620 so as to rotate around the rotor post 630. Also, connecting ducts 670 for connecting the air heater 600 to the flue (not shown) and to the pipe (not shown) for supplying combustion air are arranged on the upper and lower sides of the side pedestal 610.

The air heater 600 is operated as follows. Specifically, waste gas of the combustion furnace is allowed to flow from the flue into one region of the heating element 640 of the rotor 620 divided into two halves by the upper and lower arch members 650 from the upper end toward the lower end. Also, combustion air to be supplied to the combustion furnace is allowed to flow into the other region from the lower end toward the upper end counter-currently to the flow of the waste gas. By rotating the rotor 620 while passing each of the gas streams in this fashion, the combustion air is heated by heat exchange while cooling the waste gas. The rotor 620 is rotated at a rotating speed of about 2 to 4 rpm. The rotor 620 has three regions of a high temperature section 621, an intermediate temperature section 622, and a low temperature section 623 as viewed from the upper end toward the lower end. The low temperature section 623 has a height of about one meter, and the waste gas in the low temperature section 623 has a temperature of about 110° C.

The decarbonating apparatus comprising the dehumidifying section 100 and the decarbonating section 200 as shown in FIG. 2 is arranged on the low temperature side of the rotor 620 of the air heater 600 constructed as described above. To be more specific, rotary shafts 631 and 632 are arranged in the order mentioned right below the rotor post 630. Also, the dehumidifying drum rotor 110 is arranged around the rotary shaft 631 and the decarbonating drum rotor 210 is arranged around the rotary shaft 632. It should be noted that, in order to ensure a flow path of the combustion air to be supplied to the air heater 600 through the decarbonating section and the dehumidifying section, the drum rotors 110 and 210 are arranged around the rotary shafts 631, 632, respectively, such that these drum rotors 110 and 210 occupy only a part of the end face of the rotor 620. The rotary driving apparatus 661 rotates the dehumidifying drum rotor 110, and the rotary driving apparatus 662 rotates the decarbonating drum rotor 210. The drum rotors 110 and 210 are rotated at the same rotating speed. However, the rotating speed of these drum rotors differs from the rotating speed of the air heater. It should be noted that each piping section (not shown) shown in FIG. 2 is arranged on the upper and lower end faces of each of these drum rotors.

Figure 8:
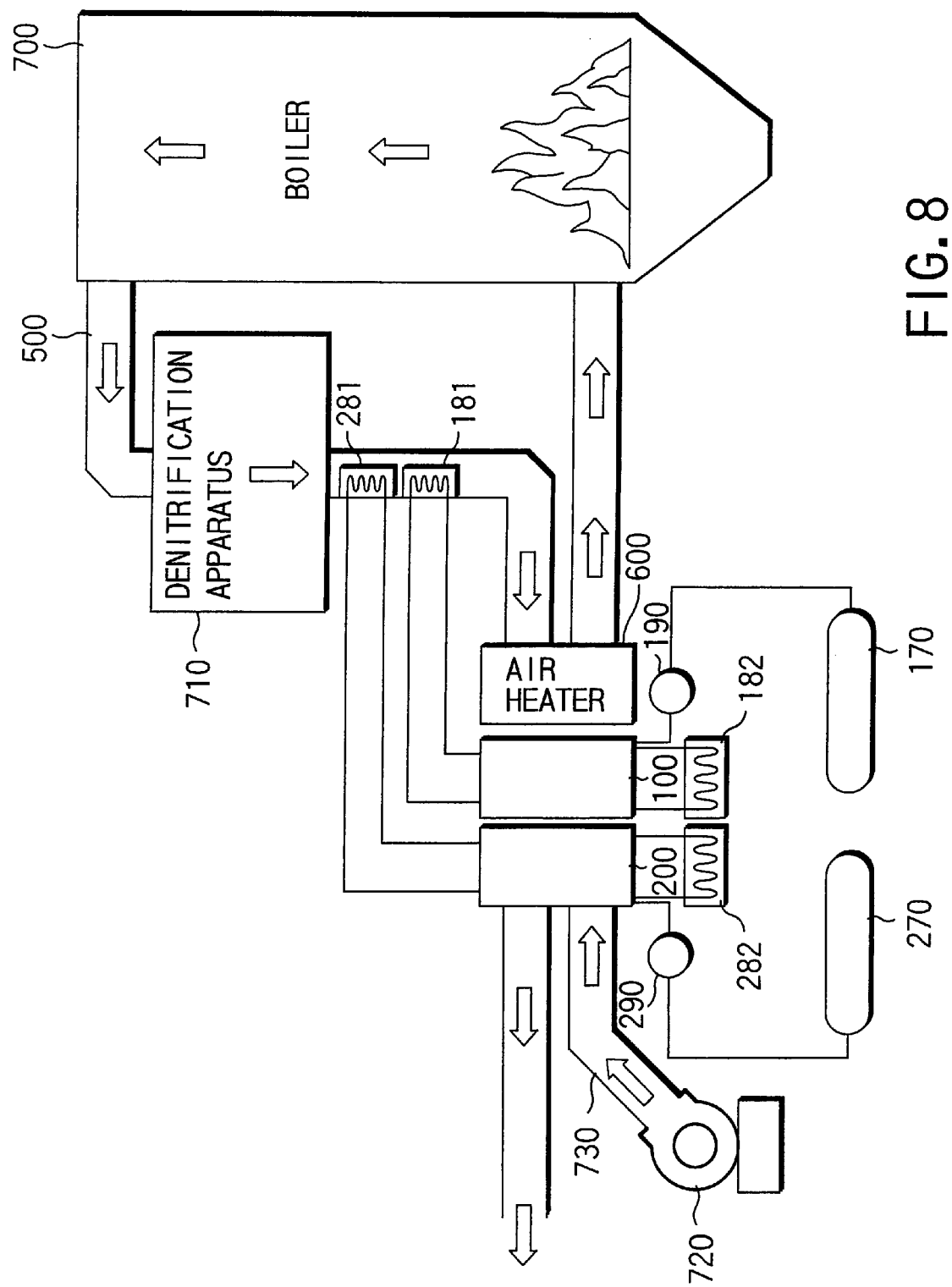
FIG. 8 schematically shows a piping system in a case where a decarbonating apparatus of the present invention is mounted directly to an air heater.

FIG. 8 schematically shows an example of the piping system for the decarbonating apparatus connected directly to the air heater shown in FIG. 7. Nitrogen oxide contained in the waste gas discharged through the flue 500 of the boiler 700 of a thermal power plant is removed with the denitrification apparatus 710 and, then, the waste gas is cooled by the air heater 600. The cooled waste gas is dehumidified in the dehumidifying section 100 and $CO_2$ is removed from the cooled waste gas in the decarbonating section 200 as described previously in conjunction with FIG. 2. The heating gases used in the dehumidifying section 100 and the decarbonating section 200 are heated by the heating heat exchangers 181 and 281, respectively, mounted to the flue 500 on the high temperature side higher than the temperature of the air heater 600 so as to be circulated for reuse. Also, the cooling gases used in the dehumidifying section 100 and the decarbonating section 200 are cooled by the exclusive cooling heat exchangers 182 and 282, respectively, so as to be circulated for reuse. Humidity recovered in the dehumidifying section 100 is transferred together with the purge gas into the dehumidifying tank 170 by a vacuum pump 190. $CO_2$ recovered in the decarbonating section 200 is transferred together with the purge gas into a $CO_2$ recovery tank 270 by a vacuum pump 290. On the other hand, the combustion air to be supplied into the boiler 700, is transferred by the forcing fan 720 through the pipe 730 so as to be heated by the air heater 600 and, then, transferred into the boiler 700.

As shown in FIGS. 7 and 8, space saving and recovery energy reduction can be achieved by connecting the decarbonating apparatus directly to the air heater.

Figure 9:
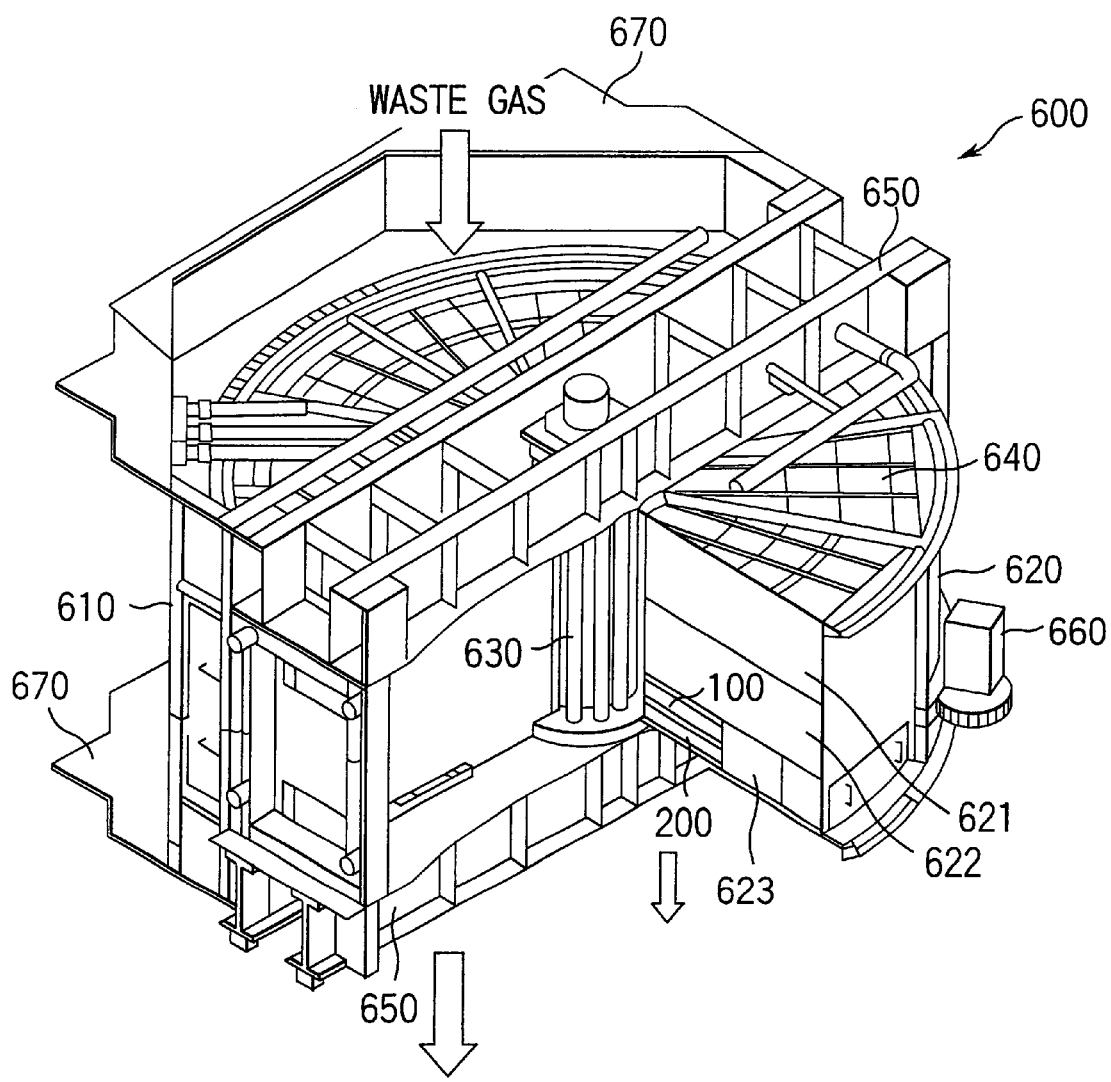
FIG. 9 is a perspective view showing a case where a decarbonating apparatus of the present invention is incorporated in an air heater.

FIG. 9 is a perspective view schematically showing the air heater 600 having the decarbonating apparatus of the present invention incorporated therein. As shown in the drawing, the decarbonating apparatus comprising the dehumidifying section 100 and the decarbonating section 200 as shown in FIG. 2 is incorporated in the low temperature section 623 of the rotor 620. To be more specific, the heating element 640 around the rotor post 630 in the low temperature section 623 is partly removed, and the dehumidifying drum rotor 110, the decarbonating drum rotor 210, and each of the piping sections are arranged in the portion where the heating element 640 is partly removed. The flow path of the combustion air to be supplied to the air heater 600 through the decarbonating section 200 and the dehumidifying section 100 is ensured. The waste gas discharged from the intermediate temperature section 622 is continuously dehumidified and decarbonated while rotating each of the drum rotors 110 and 210 and, then, the waste gas is discharged to the flue at a low temperature. In the case of using the air heater 600 having the decarbonating apparatus incorporated therein, it is possible to lower recovery energy and to achieve more space saving than in the case of FIG. 7.

In each of the apparatuses shown in FIGS. 7 and 9, the air heater is not limited to a vertical air heater. It is also possible to use a lateral air heater.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for decarbonating waste gas, comprising steps of:
    rotating a drum rotor loaded with a $CO_2$ adsorbent having a honeycomb structure;
    allowing the waste gas to flow through a region of the drum rotor so as to permit $CO_2$ contained in the waste gas to be adsorbed by the $CO_2$ adsorbent;
    supplying a heated gas to a region of the drum rotor so as to desorb $CO_2$ from the $CO_2$ adsorbent; and
    supplying a cooled gas to a region of the drum rotor so as to regenerate the $CO_2$ adsorbent, wherein these steps are performed simultaneously so as to permit the $CO_2$ adsorbent within the rotating drum rotor to be subjected successively to the $CO_2$ adsorption step, the $CO_2$ desorption step and the regeneration step.

2. A method for decarbonating waste gas, comprising steps of:
    rotating a drum rotor loaded with a $CO_2$ adsorbent having a honeycomb structure;
    allowing the waste gas to flow through a region of the drum rotor so as to permit $CO_2$ contained in the waste gas to be adsorbed by the $CO_2$ adsorbent;
    supplying a heated gas to a region of the drum rotor so as to desorb $CO_2$ from the $CO_2$ adsorbent;
    supplying a purge gas to a region of the drum rotor so as to purge $CO_2$ desorbed from the $CO_2$ adsorbent; and
    supplying a cooling gas to a region of the drum rotor so as to regenerate the $CO_2$ adsorbent,
    wherein these steps are performed simultaneously so as to permit the $CO_2$ adsorbent within the rotating drum rotor to be subjected successively to the $CO_2$ adsorption step, the $CO_2$ desorption step, the $CO_2$ purging step and the regeneration step.

3. A method for decarbonating waste gas, comprising steps of:
    rotating a dehumidifying drum rotor loaded with a humidity adsorbent having a honeycomb structure and a decarbonating drum rotor loaded with a $CO_2$ adsorbent having a honeycomb structure, the drum rotors being arranged in series;

allowing the waste gas to flow through a region of the dehumidifying drum rotor so as to permit humidity to be adsorbed by the humidity adsorbent, followed by allowing the dehumidified waste gas to flow through a region of the decarbonating drum rotor so as to permit $CO_2$ to be adsorbed by the $CO_2$ adsorbent;

supplying a heated gas to a region of the dehumidifying drum rotor so as to desorb humidity from the humidity adsorbent, together with supplying a heated gas to a region of the decarbonating drum rotor so as to desorb $CO_2$ from the $CO_2$ adsorbent;

supplying a purge gas to a region of the dehumidifying drum rotor so as to purge humidity desorbed from the humidity adsorbent, together with supplying a purge gas to a region of the decarbonating drum rotor so as to purge $CO_2$ desorbed from the $CO_2$ adsorbent; and supplying a cooled gas to a region of the dehumidifying drum rotor so as to regenerate the humidity adsorbent, together with supplying a cooled gas to a region of the decarbonating drum rotor so as to regenerate the $CO_2$ adsorbent, wherein these steps are performed simultaneously so as to permit the humidity adsorbent within the rotating dehumidifying drum rotor to be subjected successively to the humidity adsorption step, the humidity desorption step, the humidity purging step and the regeneration step and so as to permit the $CO_2$ adsorbent within the rotating decarbonating drum rotor to be subjected successively to the $CO_2$ adsorption step, the $CO_2$ desorption step, the $CO_2$ purging step and the regeneration step.

4. A decarbonating apparatus, comprising:

a drum rotor loaded with a $CO_2$ adsorbent having a honeycomb structure, the $CO_2$ adsorbent being arranged so as to adsorb $CO_2$ contained in waste gas that is allowed to flow through a region thereof;

a heated gas supply pipe for supplying a heated gas to a region of the drum rotor so as to permit adsorbed $CO_2$ to be desorbed from the $CO_2$ adsorbent;

a cooling gas supply pipe for supplying a cooling gas to a region of the drum rotor so as to regenerate the $CO_2$ adsorbent;

a heated gas recovery pipe for recovering the heated gas that has flowed through the $CO_2$ adsorbent; and a cooling gas recovery pipe for recovering the cooling gas that has flowed through the $CO_2$ adsorbent, wherein the drum rotor is configured to rotate with successively passing through the adsorption region for adsorbing $CO_2$ contained in the waste gas, the desorption region to which the heated gas is supplied, and the regeneration region to which the cooling gas is supplied.

5. A decarbonating apparatus, comprising:

a drum rotor loaded with a $CO_2$ adsorbent having a honeycomb structure, the $CO_2$ adsorbent being arranged so as to adsorb $CO_2$ contained in waste gas that is allowed to flow through a region thereof;

a heated gas supply pipe for supplying a heated gas to a region of the drum rotor so as to permit adsorbed $CO_2$ to be desorbed from the $CO_2$ adsorbent;

a purge gas supply pipe for supplying a purge gas to a region of the drum rotor so as to purge $CO_2$ desorbed from the $CO_2$ adsorbent;

a cooling gas supply pipe for supplying a cooling gas to a region of the drum rotor so as to regenerate the $CO_2$ adsorbent;

a heated gas recovery pipe for recovering the heated gas that has flowed through the $CO_2$ adsorbent;

a purge gas/$CO_2$ recovery pipe for recovering the purge gas that has flowed through the $CO_2$ adsorbent and $CO_2$ purged from the $CO_2$ adsorbent; and a cooling gas recovery pipe for recovering the cooling gas that has flowed through the $CO_2$ adsorbent, wherein the drum rotor is configured to rotate with successively passing through the adsorption region for adsorbing $CO_2$ contained in the waste gas, the desorption region to which the heated gas is supplied, the purging region to which the purge gas is supplied, and the regeneration region to which the cooling gas is supplied.

6. A decarbonating apparatus, comprising:

a dehumidifying section for adsorbing humidity contained in waste gas; and a decarbonating section for adsorbing $CO_2$ contained in the dehumidified waste gas, wherein the dehumidifying section includes: a dehumidifying drum rotor loaded with a humidity adsorbent of a honeycomb structure, the humidity adsorbent being arranged so as to adsorb humidity contained in the waste gas that is allowed to flow through a region thereof; a heated gas supply pipe for supplying a heated gas to a region of the dehumidifying drum rotor so as to permit adsorbed humidity to be desorbed from the humidity adsorbent; a purge gas supply pipe for supplying a purge gas to a region of the dehumidifying drum rotor so as to purge humidity desorbed from the humidity adsorbent; a cooling gas supply pipe for supplying a cooling gas so as to regenerate the humidity adsorbent; a heated gas recovery pipe for recovering the heated gas that has flowed through the humidity adsorbent; a purge gas/humidity recovery pipe for recovering the purge gas that has flowed through the humidity adsorbent and humidity desorbed from the humidity adsorbent; and a cooling gas recovery pipe for recovering the cooling gas that has flowed through the humidity adsorbent; in which the dehumidifying drum rotor is configured to rotate with successively passing through the adsorption region for adsorbing humidity contained in the waste gas, the desorbing region to which a heated gas is supplied, the purging region to which the purge gas is supplied, and the regeneration region to which the cooling gas is supplied, and wherein the decarbonating section includes: a decarbonating drum rotor loaded with a $CO_2$ adsorbent having a honeycomb structure, the $CO_2$ adsorbent being arranged so as to adsorb $CO_2$ contained in the waste gas that is allowed to flow through a region thereof; a heated gas supply pipe for supplying a heated gas to a region of the decarbonating drum rotor so as to permit adsorbed $CO_2$ to be desorbed from the $CO_2$ adsorbent; a purge gas supply pipe for supplying a purge gas to a region of the decarbonating drum rotor so as to purge $CO_2$ desorbed from the $CO_2$ adsorbent; a cooling gas supply pipe for supplying a cooling gas to a region of the decarbonating drum rotor so as to regenerate the $CO_2$ adsorbent; a heated gas recovery pipe for recovering the heated gas that has flowed through the $CO_2$ adsorbent; a purge gas/$CO_2$ recovery pipe for recovering the purge gas that has flowed through the $CO_2$ adsorbent and $CO_2$ purged from the $CO_2$ adsorbent; and a cooling gas recovery pipe for recovering the cooling gas that has flowed through the $CO_2$ adsorbent; in which the decarbonating drum rotor is configured to rotate with successively passing through the adsorption region for adsorbing $CO_2$ contained in the waste gas, the desorption region to which the heated gas is supplied, the purging region to which the purge gas is supplied, and the regeneration region to which the cooling gas is supplied.

7. The apparatus according to claim 6, wherein the dehumidifying drum rotor and the decarbonating drum rotor are fixed to the same shaft so as to be rotated at the same speed.

8. The apparatus according to claim 6, wherein the heated gas and the purge gas are allowed to flow concurrently with the waste gas, and the cooling gas is allowed to flow counter-currently to the waste gas.

9. The apparatus according to claim 6, further comprising heat exchangers for performing heat exchange between each of the heated gases supplied to the dehumidifying drum rotor and the decarbonating drum rotor and the waste gas on a high temperature side.

10. The apparatus according to claim 6, wherein each of the dehumidifying drum rotor and the decarbonating drum rotor is mounted such that a part the drum rotor is positioned within the flue, with the other part positioned outside the flue, and wherein the heated gas supply pipe, the purge gas supply pipe and the cooling gas supply pipe for each of the drum rotors and the recovery pipes corresponding to these supply pipes are arranged outside the flue.

11. The apparatus according to claim 6, wherein the dehumidifying drum rotor and the decarbonating drum rotor are provided on a low temperature side of an air heater comprising a rotor for performing heat exchange between waste gas discharged from a combustion furnace and combustion air to be supplied to the combustion furnace.

12. An air heater, comprising an air heater main unit including a rotor performing heat exchange between waste gas discharged from a combustion furnace and combustion air to be supplied to the combustion furnace, and a dehumidifying section for adsorbing humidity contained in the waste gas and a decarbonating section for adsorbing $CO_2$ contained in the dehumidified waste gas, which are incorporated in the low temperature section of the air heater main unit, wherein the dehumidifying section includes: a dehumidifying drum rotor loaded with a humidity adsorbent of a honeycomb structure, the humidity adsorbent being arranged so as to adsorb humidity contained in the waste gas that is allowed to flow through a region thereof; a heated gas supply pipe for supplying a heated gas to a region of the dehumidifying drum rotor so as to permit adsorbed humidity to be desorbed from the humidity adsorbent; a purge gas supply pipe for supplying a purge gas to a region of the dehumidifying drum rotor so as to purge humidity desorbed from the humidity adsorbent; a cooling gas supply pipe for supplying a cooling gas so as to regenerate the humidity adsorbent; a heated gas recovery pipe for recovering the heated gas that has flowed through the humidity adsorbent; a purge gas/humidity recovery pipe for recovering the purge gas that has flowed through the humidity adsorbent and humidity desorbed from the humidity adsorbent; and a cooling gas recovery pipe for recovering the cooling gas that has flowed through the humidity adsorbent, in which the dehumidifying drum rotor is configured to rotate with successively passing through the adsorption region for adsorbing humidity contained in the waste gas, the desorbing region to which a heated gas is supplied, the purging region to which the purge gas is supplied, and the regeneration region to which the cooling gas is supplied, and wherein the decarbonating section includes: a decarbonating drum rotor loaded with a $CO_2$ adsorbent having a honeycomb structure, the $CO_2$ adsorbent being arranged so as to adsorb $CO_2$ contained in the waste gas that is allowed to flow through a region thereof; a heated gas supply pipe for supplying a heated gas to a region of the decarbonating drum rotor so as to permit adsorbed $CO_2$ to be desorbed from the $CO_2$ adsorbent; a purge gas supply pipe for supplying a purge gas to a region of the decarbonating drum rotor so as to purge $CO_2$ desorbed from the $CO_2$ adsorbent;

a cooling gas supply pipe for supplying a cooling gas to a region of the decarbonating drum rotor so as to regenerate the $CO_2$ adsorbent; a heated gas recovery pipe for recovering the heated gas that has flowed through the $CO_2$ adsorbent; a purge gas/$CO_2$ recovery pipe for recovering the purge gas that has flowed through the $CO_2$ adsorbent and $CO_2$ purged from the $CO_2$ adsorbent; and a cooling gas recovery pipe for recovering the cooling gas that has flowed through the $CO_2$ adsorbent, in which the decarbonating drum rotor is configured to rotate with successively passing through the adsorption region for adsorbing $CO_2$ contained in the waste gas, the desorption region to which the heated gas is supplied, the purging region to which the purge gas is supplied, and the regeneration region to which the cooling gas is supplied.

* * * * *